No. 623,490. Patented Apr. 18, 1899.
E. H. MORRISON.
COFFEE POT.
(Application filed Sept. 7, 1898.)
(No Model.)
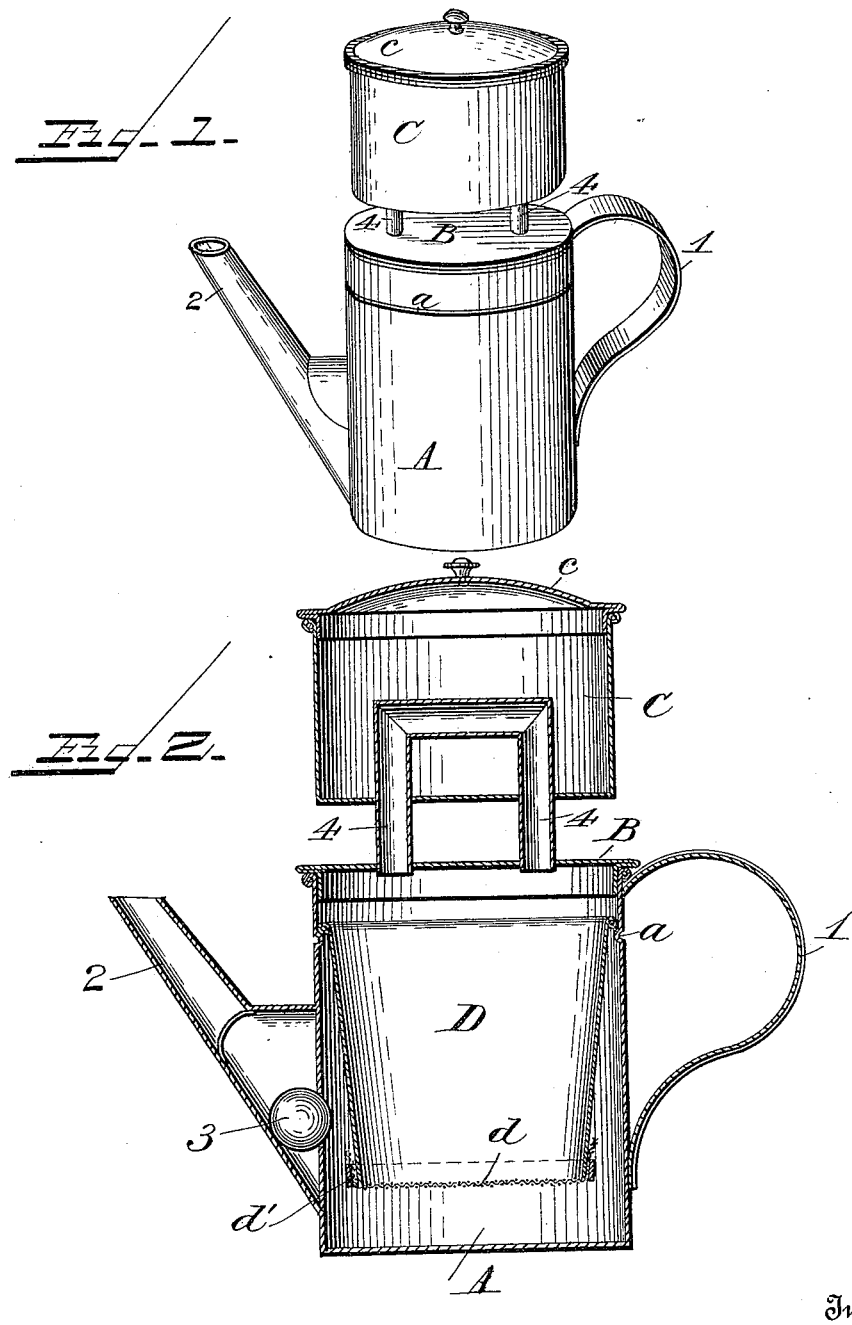

UNITED STATES PATENT OFFICE.

EDGAR H. MORRISON, OF DANVILLE, VIRGINIA, ASSIGNOR OF ONE-HALF TO JAMES A. HENDERSON, OF SAME PLACE.

COFFEE-POT.

SPECIFICATION forming part of Letters Patent No. 623,490, dated April 18, 1899.

Application filed September 7, 1898. Serial No. 690,396. (No model.)

*To all whom it may concern:*

Be it known that I, EDGAR H. MORRISON, a citizen of the United States, residing at Danville, in the county of Pittsylvania and State of Virginia, have invented certain new and useful Improvements in Coffee-Pots, of which the following is a specification.

The object of my said invention is to provide a coffee-pot which, while permitting a free circulation of the steam, prevents its escape and the strength and aroma of the coffee therewith, as in the case of those of the ordinary construction, the steam being condensed and returned into the coffee and all its strength and aroma retained; and it consists in certain improvements in the details of construction of such a coffee-pot whereby these objects are most perfectly secured, as will be hereinafter more fully described and claimed.

Referring to the accompanying drawings, which are made a part hereof and on which similar letters and numerals of reference indicate similar parts, Figure 1 is a perspective view of a coffee-pot of my improved construction, and Fig. 2 is a central vertical section through the same.

In said drawings the portions marked A represent the main portion of the coffee-pot; B, the lid or cover thereof; C, a steam-condenser, and D the coffee-receptacle.

The main vessel A is of any preferred form, having a handle 1 and spout 2. Said spout has a ball-valve 3 so arranged as to close the orifice leading into said spout from the vessel A completely when the pot is in an upright position and to roll forward and open said orifice when it is tilted forward, as when the coffee is being poured, the rest for said ball at the outer end of its movement being of a form which prevents the spout from being closed thereby.

The lid B is in main of an ordinary form, being so made as to close the top of the vessel A tightly to prevent the escape of any steam. A pipe 4, in the form of an inverted U, is connected with said lid, the lower ends of its two upright portions extending through into the top of said vessel A and being open and forming an uninterrupted circuit from one side of said vessel to the other.

The condenser C is simply a can for cold water, supported on the pipe 4, which extends up to within the same and to which said vessel is soldered. It is provided with a lid *c* and is supported a sufficient distance above the top of the vessel A to leave a considerable air-space between them in order to prevent the water therein from becoming rapidly heated.

The coffee-receptacle D is formed of tin or such material, with a rolled edge around its top which is adapted to rest on a circumferential indentation *a* around the vessel A near its top. Its sides are inclined toward its bottom to leave a free space between the two vessels, and its bottom is formed of perforated material or fabric *d*, held thereon by a rim *d'*, which surrounds said lower end and clamps said material. This form has been found desirable, but of course may be varied somewhat, if preferred.

The operation is as follows: The coffee is put into receptacle D, and vessel A is filled with the required amount of water, the two vessels being then put together, as shown in Fig. 2. The condenser C is filled with cold water and the lid B put in place to tightly close the vessel. When the water boils, the steam arises and is permitted to circulate freely through pipe 4, and as it passes through that portion within condenser C it is condensed and returned onto the coffee in receptacle D in the form of hot coffee. The spout being closed by valve 3, all the steam is thus retained in the pot and all of the strength of the coffee is utilized. The steam being permitted free circulation, a natural boiling is secured and all the best results attained.

Having thus fully described my said invention, what I claim as new, and desire to secure by Letters Patent, is—

The combination, in a coffee-pot, of the main boiling vessel provided with a handle and spout, an automatically-operating valve in said spout, the coffee-holding vessel within said main boiling vessel, the steam-tight lid B, the cold-water vessel C of separate structure, the pipe 4 in the form of an inverted U, the branches of said pipe being inserted through openings near each side of the bottom of said vessel C to bring its top midway within said vessel and rigidly secured in said position, the projecting ends being also inserted through openings in the top of the lid B near opposite sides thereof and rigidly secured therein at a point where said vessel C will be supported considerably above said lid, all substantially as described and for the purpose set forth.

In witness whereof I have hereunto set my hand and seal, at Danville, Virginia, this 3d day of September, A. D. 1898.

EDGAR H. MORRISON. [L. S.]

Witnesses:
 F. H. HENDERSON,
 N. S. PURYEAR.